(12) United States Patent
Hansen et al.

(10) Patent No.: US 7,436,616 B2
(45) Date of Patent: Oct. 14, 2008

(54) CURRENT PULSING FOR UNLOADING

(75) Inventors: Fred R. Hansen, Boulder, CO (US); Brian K. Tanner, San Jose, CA (US)

(73) Assignee: Toshiba Corporation, Tokyo (JP)

( * ) Notice: Subject to any disclaimer, the term of this patent is extended or adjusted under 35 U.S.C. 154(b) by 155 days.

(21) Appl. No.: 11/421,445

(22) Filed: May 31, 2006

(65) Prior Publication Data

US 2007/0279793 A1 Dec. 6, 2007

(51) Int. Cl.
*G11B 21/02* (2006.01)
(52) U.S. Cl. ........................................ 360/75
(58) Field of Classification Search ................ 360/75, 360/78.07, 53, 78.12, 77.02; 318/560
See application file for complete search history.

(56) References Cited

U.S. PATENT DOCUMENTS

| | | | |
|---|---|---|---|
| 4,549,232 A | 10/1985 | Axmear | |
| 4,614,986 A | 9/1986 | La Budde | |
| 4,706,250 A | 11/1987 | Patell et al. | |
| 4,811,124 A | 3/1989 | Dujari et al. | |
| 4,829,249 A | 5/1989 | Matsushita | |
| 4,833,679 A | 5/1989 | Anderson et al. | |
| 4,881,136 A | 11/1989 | Shiraishi et al. | |
| 4,993,029 A | 2/1991 | Galbraith et al. | |
| 5,068,858 A | 11/1991 | Blaum et al. | |
| 5,109,304 A | 4/1992 | Pederson | |
| 5,150,050 A | 9/1992 | Genheimer et al. | |
| 5,267,241 A | 11/1993 | Kowal | |
| 5,339,204 A | 8/1994 | James et al. | |
| 5,381,282 A * | 1/1995 | Arai et al. | 360/78.07 |
| 5,384,675 A * | 1/1995 | Crawforth et al. | 360/75 |
| 5,424,638 A | 6/1995 | Huber | |
| 5,444,719 A | 8/1995 | Cox et al. | |
| 5,455,536 A | 10/1995 | Kono et al. | |
| 5,487,077 A | 1/1996 | Hassner et al. | |
| 5,532,586 A | 7/1996 | Ishikawa | |
| 5,563,746 A | 10/1996 | Bliss | |

(Continued)

FOREIGN PATENT DOCUMENTS

EP 769774 4/1997

(Continued)

OTHER PUBLICATIONS

Al Mamun, A., et al., "Efficient position encoding in hard disk using dual frequency servo bursts", *The 27th Annual Conference on the IEEE Industrial Electronics Society, 2001. IECON '01.* vol. 1, (2001),609-614.

(Continued)

*Primary Examiner*—Fred Tzeng
(74) *Attorney, Agent, or Firm*—Schwegman, Lundberg & Woessner, P.A.

(57) ABSTRACT

A method and device for parking heads of a disk drive device involves receiving a command to immediately park the heads. A first pulse is provided to a voice coil motor causing the heads to move toward a parked position. After the first pulse, the VCM current is reduced substantially (e.g., close to zero) and back EMF in the voice coil motor is measured to determine speed of the heads. The voice coil motor is iteratively pulsed, and back EMF is measured between pulses to track a desired velocity profile to park the heads.

20 Claims, 5 Drawing Sheets

U.S. PATENT DOCUMENTS

| | | | |
|---|---|---|---|
| 5,568,331 A | | 10/1996 | Akagi et al. |
| 5,615,064 A | * | 3/1997 | Blank et al. .................. 360/75 |
| 5,659,436 A | | 8/1997 | Chainer |
| 5,663,846 A | | 9/1997 | Masuoka et al. |
| 5,751,947 A | | 5/1998 | Arakawa |
| 5,781,363 A | | 7/1998 | Rowan et al. |
| 5,792,947 A | | 8/1998 | Pogrebinsky et al. |
| 5,815,338 A | | 9/1998 | Tsunekawa et al. |
| 5,867,341 A | | 2/1999 | Volz et al. |
| 6,025,968 A | * | 2/2000 | Albrecht ..................... 360/75 |
| 6,057,926 A | | 5/2000 | Horai |
| 6,081,112 A | | 6/2000 | Carobolante et al. |
| 6,091,564 A | | 7/2000 | Codilian et al. |
| 6,101,062 A | * | 8/2000 | Jen et al. ..................... 360/75 |
| 6,101,227 A | | 8/2000 | Glover |
| 6,175,459 B1 | | 1/2001 | Tomita |
| 6,195,220 B1 | | 2/2001 | Ellis et al. |
| 6,198,584 B1 | | 3/2001 | Codilian et al. |
| 6,204,629 B1 | | 3/2001 | Rote et al. |
| 6,204,989 B1 | | 3/2001 | Hrinya et al. |
| 6,219,814 B1 | | 4/2001 | Coker et al. |
| 6,243,224 B1 | | 6/2001 | Sacks et al. |
| 6,259,576 B1 | | 7/2001 | Ahn |
| 6,292,316 B1 | | 9/2001 | Dietzel et al. |
| 6,292,913 B1 | | 9/2001 | Son |
| 6,363,214 B1 | | 3/2002 | Merello et al. |
| 6,411,459 B1 | | 6/2002 | Belser et al. |
| 6,429,995 B1 | | 8/2002 | Dobbek et al. |
| 6,469,849 B1 | | 10/2002 | Ellis et al. |
| 6,476,996 B1 | * | 11/2002 | Ryan .......................... 360/75 |
| 6,490,111 B1 | | 12/2002 | Sacks |
| 6,498,698 B1 | * | 12/2002 | Golowka et al. ......... 360/78.12 |
| 6,519,107 B1 | | 2/2003 | Ehrlich et al. |
| 6,522,488 B2 | | 2/2003 | Sasamoto et al. |
| 6,608,477 B2 | | 8/2003 | Sacks et al. |
| 6,631,046 B2 | | 10/2003 | Szita et al. |
| 6,639,749 B1 | * | 10/2003 | Kazmierczak et al. ........ 360/75 |
| 6,643,082 B1 | | 11/2003 | Belser |
| 6,651,213 B2 | | 11/2003 | Hassner et al. |
| 6,704,156 B1 | | 3/2004 | Baker et al. |
| 6,754,019 B2 | * | 6/2004 | Tokizono et al. .............. 360/53 |
| 6,760,179 B2 | | 7/2004 | Moon et al. |
| 6,760,184 B1 | | 7/2004 | Cunningham |
| 6,785,075 B2 | | 8/2004 | Bryant et al. |
| 6,785,084 B2 | | 8/2004 | Szita |
| 6,819,072 B2 | * | 11/2004 | White et al. ................. 318/560 |
| 6,859,340 B2 | * | 2/2005 | Brittner et al. ................ 360/75 |
| 6,885,514 B1 | | 4/2005 | Codilian et al. |
| 6,906,884 B2 | | 6/2005 | Yasuna |
| 6,940,679 B1 | | 9/2005 | McNeil et al. |
| 6,943,977 B2 | | 9/2005 | Yatsu |
| 6,961,203 B1 | | 11/2005 | Baker |
| 7,023,631 B2 | | 4/2006 | Zhang et al. |
| 7,046,475 B2 | * | 5/2006 | Hosokawa ................... 360/75 |
| 7,099,106 B2 | * | 8/2006 | Park ........................... 360/75 |
| 7,212,371 B2 | * | 5/2007 | Abe et al. ................. 360/77.02 |
| 7,295,395 B2 | * | 11/2007 | Koh et al. .................... 360/75 |
| 2001/0019463 A1 | * | 9/2001 | Drouin ........................ 360/75 |
| 2002/0033687 A1 | * | 3/2002 | Abe et al. ................... 318/560 |
| 2002/0141101 A1 | | 10/2002 | Brittner et al. |
| 2003/0065469 A1 | | 4/2003 | Pedrazzini et al. |
| 2003/0161065 A1 | | 8/2003 | Yatsu |
| 2003/0179482 A1 | | 9/2003 | Fukushima |
| 2003/0189781 A1 | | 10/2003 | Dunn |
| 2003/0214747 A1 | | 11/2003 | Baral |
| 2004/0061968 A1 | | 4/2004 | Fukushima et al. |
| 2004/0075935 A1 | | 4/2004 | Yatsu |
| 2004/0114270 A1 | | 6/2004 | Chung et al. |
| 2004/0123025 A1 | | 6/2004 | Chainer et al. |
| 2004/0145825 A1 | | 7/2004 | Miles |
| 2004/0150907 A1 | * | 8/2004 | Hong .......................... 360/75 |
| 2004/0201914 A1 | | 10/2004 | Ikeda et al. |
| 2004/0264019 A1 | | 12/2004 | Curtiss et al. |
| 2004/0264031 A1 | | 12/2004 | Yatsu |
| 2005/0013037 A1 | | 1/2005 | Tanner |
| 2005/0052767 A1 | | 3/2005 | Miyata |
| 2005/0073770 A1 | | 4/2005 | Ehrlich et al. |
| 2005/0078403 A1 | | 4/2005 | Mizukoshi |
| 2005/0082996 A1 | | 4/2005 | Luebbe |
| 2005/0099720 A1 | | 5/2005 | Chung |
| 2005/0117240 A1 | | 6/2005 | Codillian et al. |
| 2005/0117245 A1 | | 6/2005 | Park et al. |
| 2005/0152058 A1 | | 7/2005 | Schmidt |
| 2005/0174679 A1 | | 8/2005 | Chan et al. |
| 2005/0207051 A1 | | 9/2005 | Fukushima |
| 2005/0218853 A1 | | 10/2005 | Kokami |
| 2005/0237646 A1 | | 10/2005 | Ehrlich |
| 2005/0237653 A1 | | 10/2005 | Ehrlich |
| 2005/0237656 A1 | | 10/2005 | Ehrlich |
| 2005/0237658 A1 | | 10/2005 | Ehrlich |
| 2005/0237659 A1 | | 10/2005 | Ehrlich |
| 2005/0248072 A1 | | 11/2005 | Ehrlich |
| 2005/0254160 A1 | | 11/2005 | Bandic et al. |

FOREIGN PATENT DOCUMENTS

| | | |
|---|---|---|
| EP | 962915 | 12/1999 |
| GB | 2361576 | 10/2001 |
| JP | 62188015 | 8/1987 |
| JP | 63211116 | 9/1988 |
| JP | 3214474 | 9/1991 |
| JP | 2001014816 | 1/2001 |
| JP | 2002288956 | 10/2002 |
| JP | 2005352536 | 12/2002 |
| JP | 2003-008590 | 1/2003 |
| JP | 2003085904 | 3/2003 |
| JP | 2005174429 | 6/2005 |
| JP | 2005190509 | 7/2005 |
| WO | WO-9741558 | 11/1997 |

OTHER PUBLICATIONS

Al Mamun, A., et al., "Measurement of position offset in hard disk drive using dual frequency servo bursts", *IEEE Transactions on Instrumentation and Measurement*, 52(6), (2003), 1870-1880.

Gurumurthi, Sudhanva, et al., "DRPM: Dynamic Speed Control for Power Management in Server Class Disks", *Proceedings of the 30th Annual International Symposium on Computer Architecture*, (2003), 169-181.

Hughes, E C., et al., "Characterization of three servo patterns for position error signal generation in hard drives", *Proceedings of the 2003 American Control Conference*, (Jun. 2003),4317-4322.

Matsuoka, Kaoru, "Servo track writing of HDDs using magnetic printing technology", *JSME News*, 16(1), The Japan Society of Mechanical Engineers,(2005), 1-10.

Sacks, Alexei, "Positive error signal generation in magnetic disk drives", (*Presentation*)—*PhD Thesis of Alexei Sacks, Carnegie-Mellon University*, (1995),1-37.

Schultz, M D., et al., "A self-servowrite clocking process", *IEEE Transactions on Magnetics*, 37(4), (Jul. 2001),1878-1880.

Sereinig, W., "Motion control: the power side of disk drives", *Proceedings of the International Conference on Computer Design: VLSI in Computers& Processors*, (2001),1-6.

Takaishi, K., et al., "Hard disk drive servo technology for media-level servo track writing", *IEEE Transactions on Magnetics*, 39(2), (Mar. 2003),851-856.

Ye, Haibei, et al., "Radial error propagation issues in self-servo track writing technology", *IEEE Transactions on Magnetics*, 38(5), (Sep. 2002),2180-2182.

* cited by examiner

FIG. 6

CURRENT PULSING FOR UNLOADING

BACKGROUND

A disk drive is an information storage device. A disk drive includes one or more disks clamped to a rotating spindle, and at least one head for reading information representing data from and/or writing data to the surfaces of each disk. The head is supported by a suspension coupled to an actuator that may be driven by a voice coil motor. Control electronics in the disk drive provide electrical pulses to the voice coil motor to move the head to desired positions on the disks to read and write the data, and to park the head in a safe area when not in use or when otherwise desired for protection of the disk drive.

A seek operation is an operation where the voice coil motor is provided current to cause the head to find the proper track of data in which to read or write. Typically in a normal seek, as much current as possible is drive through the actuator voice coil motor to maximize the performance of the disk drive by minimizing the seek time.

Parking the head or heads may need to be done quickly to avoid damage to the head, disks, and data stored on the disks. There is a need to increase the speed at which the head is parked. Parking the heads quickly has been done by providing a large amount of current to the voice coil motor. However, such large currents may cause excessive heating of the electronics, leading to damage. Older, larger disk drives employed current pulses in an open loop to avoid burning up electronics. There is a need to retract the heads quickly, without causing excessive heating and damage to the electronics or motor.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

The description set out herein illustrates the various embodiments of the invention and such description is not intended to be construed as limiting in any manner.

DETAILED DESCRIPTION

A pulse width modulation approach is utilized during unloading of the heads in a disk drive device. Such an approach monitors back EMF between pulses to determine the velocity of the heads, and then selects the next current pulses to park the heads in a fast manner. This can be useful should the disk drive device anticipate a mechanical shock that may cause damage to un-parked heads.

When a head or transducer or load beam or load spring needs to be parked or placed on a ramp immediately, the current velocity or current position may be ignored and a pulse of current applied to the voice coil motor. The initial pulse of current will move the actuator in the direction of the ramp where the actuator will be parked. After the initial current pulse, additional pulses of current may be applied to the voice coil motor. The amplitude of the pulses may be changed (pulse amplitude modulation) to change the velocity of the actuator. The velocity of the actuator follows a velocity profile associated with a velocity trajectory that is designed to park the actuator in a quick and efficient manner. The back EMV is measured between current pulses. The back EMF may be directly related to the sum of the actuator velocity and the product of the coil resistance with the VCM current. By measuring the back EMF between pulses when the VCM current is at a substantially reduced value (e.g., close to zero), the back EMF becomes a function of the actuator velocity only and so can be used as an accurate measure of the actuator velocity. The amplitude of the current pulses is selected, based on the measured back EMF, to either keep the velocity the same or change the velocity of the actuator so that it substantially matches the velocity profile to park the heads in a desired manner.

The general operation of a disk drive is now described, followed by further detail regarding algorithms for parking the actuator/heads and a computer architecture for executing such algorithms. An actuator retract system and method for moving read/write heads from data regions on disks to non-data locations in a disk drive is also described. The non-data locations may be on or in close proximity to the disks. The non-data locations may be a landing zone or a load/unload ramp.

Figure 1:
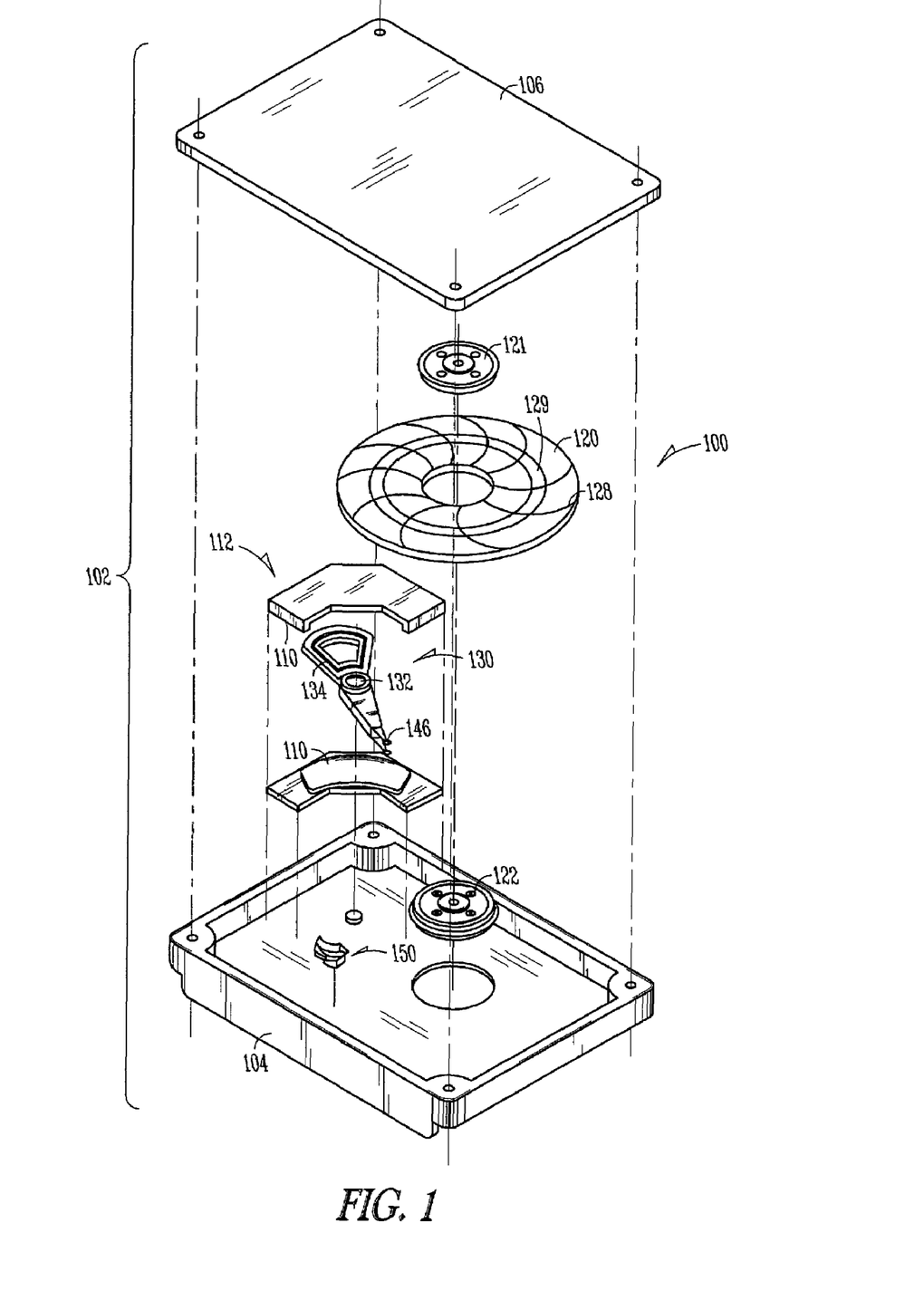
FIG. 1 is an exploded view of a disk drive that uses example embodiments described herein.

FIG. 1 is an exploded view of disk drive 100 that uses various embodiments of the present invention. The disk drive 100 includes a housing 102 including a housing base 104 and a housing cover 106. The housing base 104 illustrated is a base casting, but in other embodiments a housing base 104 can comprise separate components assembled prior to, or during assembly of the disk drive 100. A disk 120 is attached to a hub or spindle 122 that is rotated by a spindle motor. The disk 120 can be attached to the hub or spindle 122 by a clamp 121. The disk may be rotated at a constant or varying rate ranging from less than 3,600 to more than 15,000 revolutions per minute. Higher rotational speeds are contemplated in the future. The spindle motor is connected with the housing base 104. The disk 120 can be made of a light aluminum alloy, ceramic/glass or other suitable substrate, with magnetizable material deposited on one or both sides of the disk. The magnetic layer includes small domains of magnetization for storing data transferred through a transducing head 146. The transducing head 146 includes a magnetic transducer adapted to read data from and write data to the disk 120. In other embodiments, the transducing head 146 includes a separate read element and write element. For example, the separate read element can be a magneto-resistive head, also known as a MR head. It will be understood that multiple head 146 configurations can be used.

A rotary actuator 130 is pivotally mounted to the housing base 104 by a bearing 132 and sweeps an arc between an inner diameter (ID) of the disk 120 and a ramp 150 positioned near an outer diameter (OD) of the disk 120. Attached to the housing 104 are upper and lower magnet return plates 110 and at least one magnet that together form the stationary portion of a voice coil motor (VCM) 112. A voice coil 134 is mounted to the rotary actuator 130 and positioned in an air gap of the VCM 112. The rotary actuator 130 pivots about the bearing 132 when current is passed through the voice coil 134 and pivots in an opposite direction when the current is reversed, allowing for control of the position of the actuator 130 and the attached transducing head 146 with respect to the disk 120. The VCM 112 is coupled with a servo system that uses positioning data read by the transducing head 146 from the disk 120 to determine the position of the head 146 over one of a plurality of tracks on the disk 120. The servo system determines an appropriate current to drive through the voice coil 134, and drives the current through the voice coil 134 using a current driver and associated circuitry (not shown in FIG. 1).

Each side of a disk 120 can have an associated head 146, and the heads 146 are collectively coupled to the rotary actuator 130 such that the heads 146 pivot in unison. The invention described herein is equally applicable to devices wherein the individual heads separately move some small distance relative to the actuator. This technology is referred to as dual-stage actuation (DSA).

One type of servo system is an embedded, servo system in which tracks on each disk surface used to store information representing data contain small segments of servo information. The servo information, in some embodiments, is stored in radial servo sectors or servo wedges 128 shown as several narrow, somewhat curved spokes substantially equally spaced around the circumference of the disk 120. It should be noted that in actuality there may be many more servo wedges than as shown in FIG. 1.

The disk 120 also includes a plurality of tracks on each disk surface. The plurality of tracks is depicted by two tracks, such as track 129 on the surface of the disk 120. The servo wedges 128 traverse the plurality of tracks, such as track 129, on the disk 120. The plurality of tracks, in some embodiments, may be arranged as a set of substantially concentric circles. Data is stored in fixed sectors along a track between the embedded servo wedges 128. The tracks on the disk 120 each include a plurality of data sectors. More specifically, a data sector is a portion of a track having a fixed block length and a fixed data storage capacity (e.g. 512 bytes of user data per data sector). The tracks toward the inside of the disk 120 are not as long as the tracks toward the periphery of the disk 120. As a result, the tracks toward the inside of the disk 120 can not hold as many data sectors as the tracks toward the periphery of the disk 120. Tracks that are capable of holding the same number of data sectors are grouped into data zones. Since the density and data rates vary from data zone to data zone, the servo wedges 128 may interrupt and split up at least some of the data sectors. The servo wedges 128 are typically recorded with a servo writing apparatus at the factory (called a servo-writer), but may be written (or partially written) with the transducing head 146 of the disk drive 100 in a self-servowriting operation.

Figure 2:
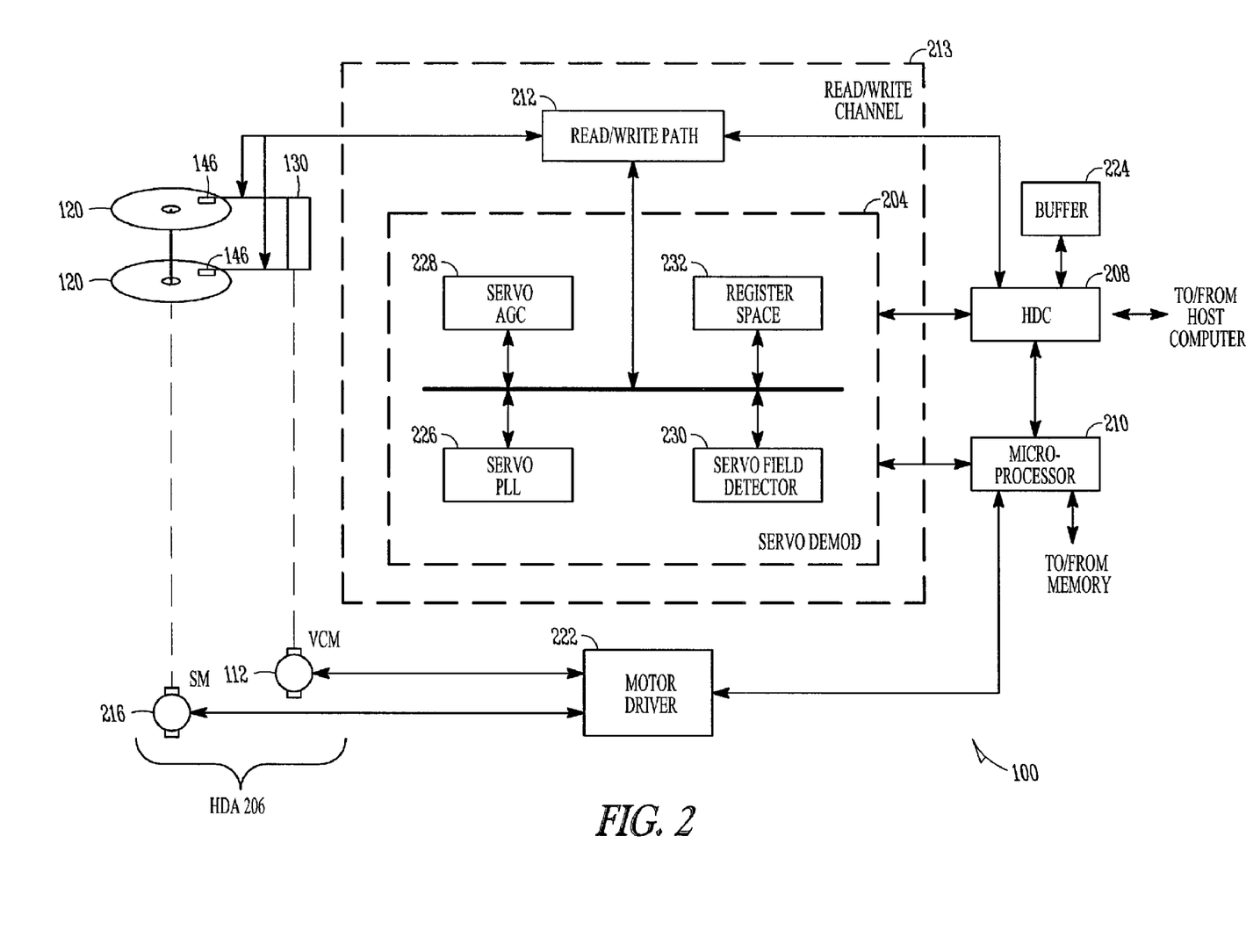
FIG. 2 is a schematic diagram of a disk drive and includes various electrical portions of the disk drive, according to an example embodiment.

The disk drive 100 not only includes many mechanical features and a disk with a servo pattern thereon, but also includes various electronics for reading signals from the disk 120 and writing information representing data to the disk 120. FIG. 2 is a schematic diagram of a disk drive 200 that more fully details some of example electronic portions of the disk drive 100, according to an example embodiment. Referring to FIG. 2, the disk drive device 200 is shown as including a head disk assembly (HDA) 206, a hard disk controller (HDC) 208, a read/write channel 213, a microprocessor 210, a motor driver 222 and a buffer 224. The read/write channel 213 is shown as including a read/write path 212 and a servo demodulator 204. The read/write path 212, which can be used to read and write user data and servo data, may include front end circuitry useful for servo demodulation. The read/write path 212 may also be used for writing servo information in self-servowriting. It should be noted that the disk drive 100 also includes other components, which are not shown because they are not necessary to explain the example embodiments.

The HDA 206 includes one or more disks 120 upon which data and servo information can be written to, or read from, by transducers or transducing heads 146. The voice coil motor (VCM) 112 moves an actuator 130 to position the transducing heads 146 on the disks 120. The motor driver 222 drives the VCM 112 and the spindle motor (SM) 216. More specifically, the microprocessor 210, using the motor driver 222, controls the VCM 112 and the actuator 130 to accurately position the heads 146 over the tracks (described with reference to FIGS. 1-3) so that reliable reading and writing of data can be achieved. The servo wedges 128, discussed above in the description of FIGS. 1-3, are used for servo control to keep the heads 146 on track and to assist with identifying proper locations on the disks 120 where data is written to or read from. When reading a servo wedge 128, the transducing heads 146 act as sensors that detect the position information in the servo wedges 128, to provide feedback for proper positioning of the transducing heads 146.

The servo demodulator 204 is shown as including a servo phase locked loop (PLL) 226, a servo automatic gain control (AGC) 228, a servo field detector 230 and register space 232. The servo PLL 226, in general, is a control loop that is used to provide frequency and phase control for the one or more timing or clock circuits (not shown in FIG. 2), within the servo demodulator 204. For example, the servo PLL 226 can provide timing signals to the read/write path 212. The servo AGC 228, which includes (or drives) a variable gain amplifier, is used to keep the output of the read/write path 212 at a substantially constant level when servo wedges 128 on one of the disks 120 are being read. The servo field detector 230 is used to detect and/or demodulate the various subfields of the servo wedges 128, including a SAM, a track number, a first phase servo burst, and a second phase servo burst. The microprocessor 210 is used to perform various servo demodulation functions (e.g., decisions, comparisons, characterization and the like), and can be thought of as being part of the servo demodulator 204. In the alternative, the servo demodulator 204 can have its own microprocessor.

One or more registers (e.g., in register space 232) can be used to store appropriate servo AGC values (e.g., gain values, filter coefficients, filter accumulation paths, etc.) for when the read/write path 212 is reading servo data, and one or more registers can be used to store appropriate values (e.g., gain values, filter coefficients, filter accumulation paths, etc.) for when the read/write path 212 is reading user data. A control signal can be used to select the appropriate registers according to the current mode of the read/write path 212. The servo AGC value(s) that are stored can be dynamically updated. For example, the stored servo AGC value(s) for use when the read/write path 212 is reading servo data can be updated each time an additional servo wedge 128 is read. In this manner, the servo AGC value(s) determined for a most recently read servo wedge 128 can be the starting servo AGC value(s) when the next servo wedge 128 is read.

The read/write path 212 includes the electronic circuits used in the process of writing and reading information to and from disks 120. The microprocessor 210 can perform servo control algorithms, and thus, may be referred to as a servo controller. Alternatively, a separate microprocessor or digital signal processor (not shown) can perform servo control functions.

Typically in a normal seek, as much current as possible is driven to maximize performance. However, in one embodiment, a fixed, but relatively low current is driven through the voice coil motor during a seek, and servile data (data from the servo information read from the disk) is used to measure the velocity of the actuator. This allows an accurate estimate of the back EMF voltage, and hence the ability to calculate a correction factor for the voice coil motor resistance. The measurement may be done several different times, such as approximately four times in one embodiment to account for error factors such as hardware offsets.

In one embodiment, current is passed in both directions, or the seek may be performed across different sets of tracks as desired to obtain a more accurate correction factor.

Figure 3:
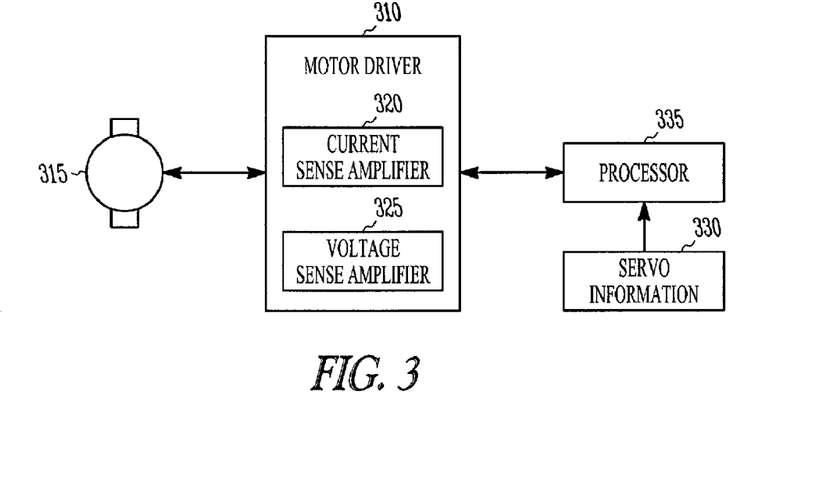
FIG. 3 is a block schematic diagram of a voice coil motor driver according to an example embodiment.

FIG. 3 is a block schematic diagram of a voice coil motor driver 310 according to an example embodiment. The voice coil motor driver 310 is coupled to a voice coil motor 315 for driving it at desired levels. The voice coil motor driver 310 includes a current sense amplifier 320 that senses current through the voice coil motor 315, and also includes a voltage sense amplifier 325 that senses voltage across the voice coil motor 315. These measurements provide an accurate value of voice coil motor resistance. A small back EMF voltage generated by the voice coil moving in the motor can be measured. This back EMF voltage is proportional to the voice coil motor velocity, which may also be measured from read servo information as indicated in block 330.

The voice coil motor resistance may be measured during a seek operation whereby correlation between the measured voice coil motor velocity via servo demodulation 330 that determines data head radial position, and back EMF based velocity measured gives an estimate of voice coil motor resistance. This way, an accurate voice coil motor resistance can be determined during seek operations, allowing rapid and accurate head parking functions. Processing of the back EMF measurements may be performed by a processor 335 coupled to the motor driver 310 and the servo information 330.

Figure 4:
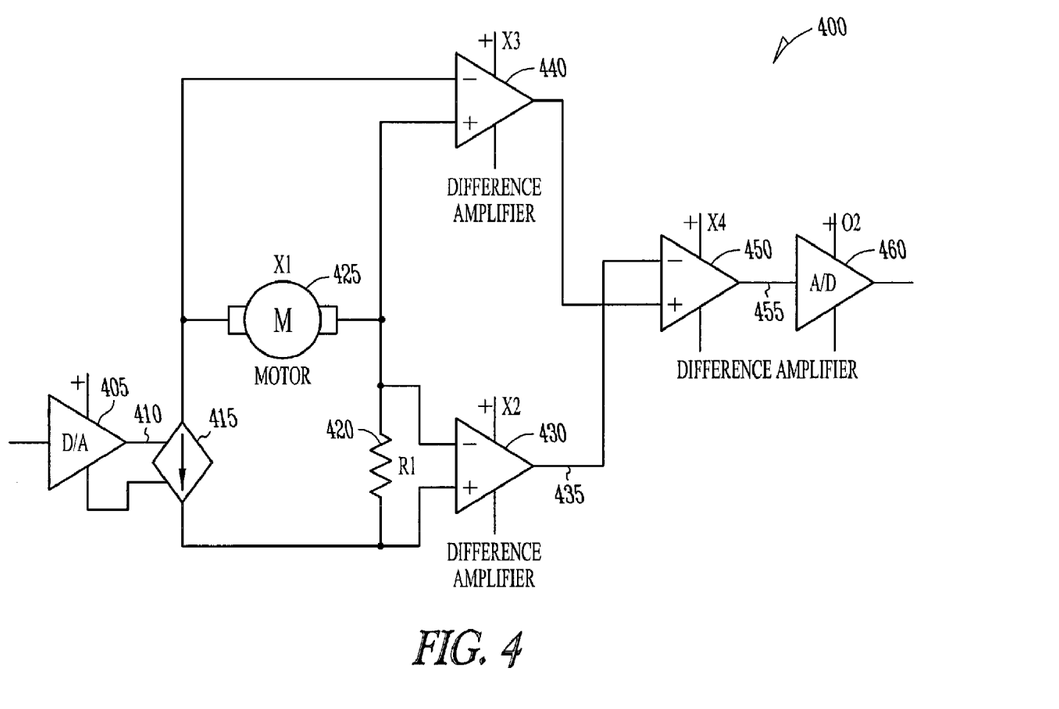
FIG. 4 is a circuit diagram showing sense amplifiers in relation to the voice coil motor according to an example embodiment.

FIG. 4 is a circuit diagram 400 showing the sense amplifiers in relation to the voice coil motor. A DAC 405 takes a computed demanded current and creates a voltage at 410 that drives a trans-conductance amplifier at 415 that in turn produces a current through a resistor at 420 and a voice coil motor (VCM) at 425. The current through resistor 420 produces a voltage across inputs of a difference amplifier 430. An output 435 of amplifier 430 is proportional to the VCM current. Amplifier 430 is a VCM current sense amplifier in one embodiment.

A voltage sense amplifier 440 is coupled across motor 425 to measure back EMF motor voltage. In one embodiment, the voltage sense amplifier 440 has a fixed gain. In one embodiment, the configuration of the circuit 400 is such that the gain of the amplifier 430 is programmable and as such can be use to significantly (but not necessarily completely) reduce the effects of the internal VCM motor resistance in producing errors in the measured VCM back EMF voltage by subtraction of the signals at the outputs of amplifier 440 and amplifier 430 which are provided to an amplifier at 450. Amplifier 450 provides a difference signal at 455, which is converted to a digital word by an ADC at 460.

A further firmware technique may be used to subtract out any residual error introduced by the VCM current caused by IR drop internal to the VCM motor 425. Essentially a factor is determined via measurement at more than one VCM current operating point that produces a minimum error in the estimated VCM velocity determined by the measurement of VCM back EMF voltage. This factor is multiplied by the VCM current to cancel any VCM resistance errors in measurement of the back EMF voltage.

Figure 5:
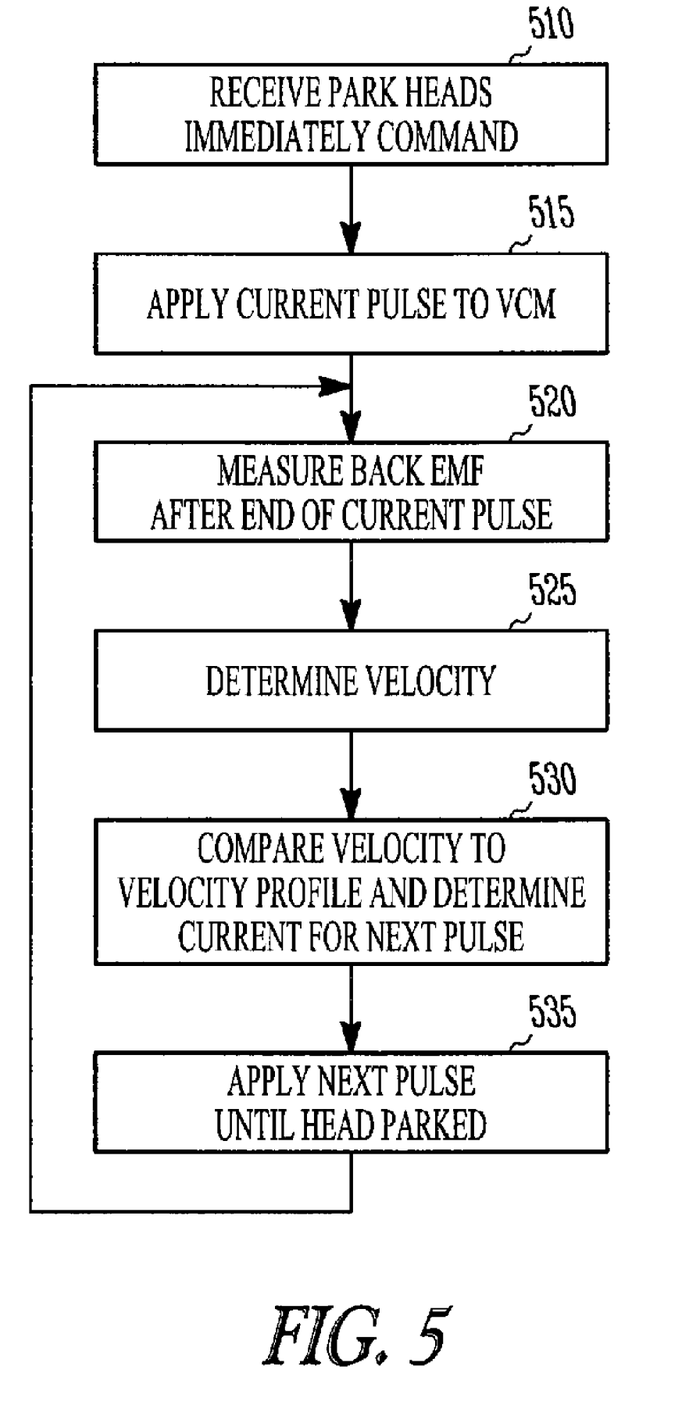
FIG. 5 is a flow chart illustrating pulsing of the voice coil motor to quickly park heads according to an example embodiment.

FIG. 5 is a flow chart illustrating pulsing of the voice coil motor to quickly park heads according to an example embodiment. In one embodiment, rather than having a near constant target VCM current, a series of current pulses are applied to the VCM by applying a pulse sequence to the input of the trans-conductance amplifier 415. The VCM back EMF voltage is measured after the current in the VCM motor has reached near zero. This implies that the error associated with the VCM resistance and VCM current are minimized. This in turn limits (or at best eliminates) requirements to perform a calibration or adjustment of the gain of current sense amplifier 430.

In FIG. 5, a command to park the heads quickly is received at 510. In one embodiment, the command is referred to as an unload immediate command. It may arise if the disk drive senses that it has been dropped, and may soon impact a surface and cause high forces within the drive that could cause mechanical deformation and damage the heads or data under the heads. The disk drive may include a type of free fall sensor to initiate such a command. The free fall sensor may be accelerometer based. Thus, the command is a type of command that initiates parking of the heads as quickly as possible to move the heads to a safe place and avoid damage.

In one embodiment, at 515, a first current pulse of predetermined current is applied to the VCM to begin to move the actuator and heads toward the parking area. The first pulse is applied to start the heads moving in the right direction as quickly as possible. The amount of current may be varied depending on the embodiment. A substantially zero current (or close to zero current) is then applied to the VCM and the back EMF is monitored after the current is removed at 520, and velocity is determined at 525. This is used to calculate the amount of current for the next current pulse at 530 to help match the velocity to a velocity profile for parking the heads. The next current pulse is applied at 535, and processing returns to 520 to zero the VCM current and measure the back EMF. When the head is finally parked, the process is exited. In effect, this provides a pulse width modulation (PWM) approach in which current is selectively applied after looking at the back EMF between current pulses.

In one embodiment, various control algorithms may be applied to determine the amount of current for the next pulse. Such algorithms may be based on common PID (proportional, integral, derivative) controls to ensure that the actual velocity of the actuator effectively tracks the desired velocity profile. The desired profile may be derived from empirical measurements, or calculated with desired park times constrained by circuit damage related concerns. In one embodiment, the heads may be parked in a non-data area of the disk drive. In further embodiments, a ramp or other structure may be provided to lift the heads off the disk to minimize the chances of the heads impacting the disks when the disk drive is subjected to high G forces, such as by being dropped.

Figure 6:
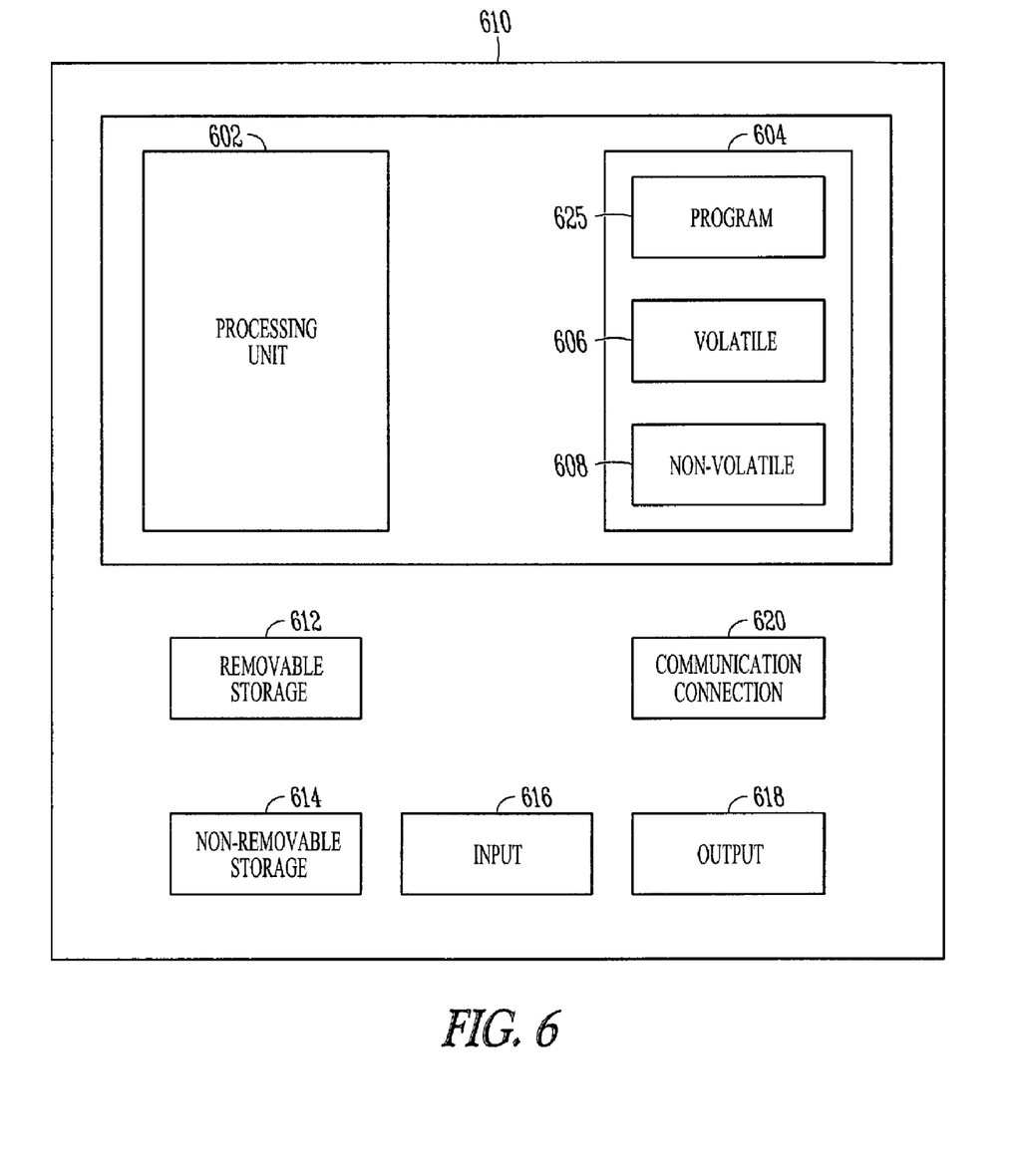
FIG. 6 is a representation of a computing system, according to an example embodiment.

A block diagram of a computer system that executes programming for performing the above algorithm is shown in FIG. 6. A general computing device in the form of a computer 610, may include a processing unit 602, memory 604, removable storage 612, and non-removable storage 614. Memory 604 may include volatile memory 606 and non volatile memory 608. Computer 610 may include—or have access to a computing environment that includes—a variety of computer-readable media, such as volatile memory 606 and non volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disk read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks. The microprocessor 210 or other selected circuitry or components of the disk drive may be such a computer system.

Computer-readable instructions stored on a computer-readable medium are executable by the processing unit 602 of the computer 610. A hard drive, CD-ROM, and RAM are some examples of articles including a computer-readable medium. For example, a computer program 625 executed to control the writing of information associated with successive flush cache commands from a host 440 according to the teachings of the present invention may be included on a CD-ROM and loaded from the CD-ROM to a hard drive. The computer program may also be termed firmware associated with the disk drive. In some embodiments, a copy of the computer program 625 can also be stored on the disk 120 of the disk drive.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

The Abstract is provided to comply with 37 C.F.R. § 1.72 (b) to allow the reader to quickly ascertain the nature and gist of the technical disclosure. The Abstract is submitted with the understanding that it will not be used to interpret or limit the scope or meaning of the claims.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of parking heads of a disk drive device, the method comprising:
   receiving a command to immediately park the heads;
   providing a first pulse to a voice coil motor causing the heads to move toward a parked position;
   after the first pulse, substantially reducing a current in the voice coil motor to about zero;
   measuring back EMF in the voice coil motor after the current in the voice coil motor has fallen to about zero to determine speed of the heads; and
   iteratively pulsing and measuring back EMF between pulses to track a desired velocity profile to park the heads by changing an amplitude of the pulses.

2. The method of claim 1 wherein the parked position comprises a ramp.

3. The method of claim 1 wherein the amplitude of the pulses are changed responsive to the measured EMF to track the desired velocity profile.

4. The method of claim 1 wherein a form of PID algorithm is applied to track the desired velocity profile.

5. The method of claim 1 wherein the command is the result of sensing a free fall condition.

6. The method of claim 1 wherein the heads are parked in a safe area of the disk drive.

7. The method of claim 6 wherein the heads are parked on a ramp.

8. A method of parking heads of a disk drive device, the method comprising:
   receiving a command to immediately park the heads;
   iteratively pulsing a voice coil motor with current to move the heads toward a parking area; and
   measuring back EMF between pulses when the voice coil motor current is substantially reduced to about zero to determine a current for the next iterative pulse of current to the voice coil motor to park the heads quickly, wherein the pulses are varied in amplitude.

9. The method of claim 8 wherein the parked position comprises a ramp.

10. The method of claim 8 wherein the pulses are varied in amplitude responsive to the measured EMF to track a desired velocity profile.

11. The method of claim 10 wherein a form of PID algorithm is applied to track the desired velocity profile.

12. The method of claim 8 wherein the command is the result of sensing a free fall condition.

13. The method of claim 8 wherein the heads are parked in a safe area of the disk drive.

14. The method of claim 13 wherein the heads are parked on a ramp.

15. The method of claim 8 wherein a first pulse is applied at a predetermined current to cause the heads to start moving toward the parking area.

16. A disk drive device comprising:
   a plurality of disks coupled to a spindle for rotating the disks;
   an actuator that supports heads over the disks for reading and writing data on the disks;
   a voice coil motor coupled to the actuator for moving the heads about the disks; and
   a voice coil driver that in response to a park immediate command, iteratively pulses the voice coil motor with current to move the heads toward a parking area and measures back EMF between the current pulses when the current in the voice coil motor is substantially reduced to about zero to determine a current for the next iterative pulse of current to the voice coil motor to park the heads quickly, wherein the pulses are varied in amplitude.

17. The disk drive device of claim 16 wherein the parking area includes a ramp that lifts the heads off the disks.

18. The disk drive device of claim 16 wherein the pulses are varied in amplitude responsive to the measured EMF to track a desired velocity profile.

19. The disk drive device of claim 18 wherein a form of PID algorithm is applied to track the desired velocity profile.

20. The disk drive device of claim 16 the voice coil motor driver applies a first pulse at a predetermined current to cause the heads to start moving toward the parking area.

* * * * *